3,471,417
FLEXIBLE URETHANE FOAMS FROM CRUDE POLYISOCYANATES
Eugene A. Dickert, Buffalo, N.Y., assignor to Allied Chemical Corporation, New York, N.Y., a corporation of New York
No Drawing. Filed Mar. 24, 1965, Ser. No. 442,488
Int. Cl. C08g 22/44
U.S. Cl. 260—2.5                                   8 Claims This invention relates to flexible urethane structures. More particularly, it relates to flexible cellular urethane structures which have excellent flex fatigue properties and to processes for the preparation thereof.

Cellular urethane structures, it is known, are prepared by reacting in the presence of a blowing agent, a polyfunctional active hydrogen containing polyester, polyester amide or polyether with at least one polyisocyanate. Such cellular structures are characterized as flexible or rigid depending primarily upon the extent and degree of crosslinking in the polymeric structure. Thus a urethane structure derived from a polyalkylene ether polyol of relatively large average molecular weight and relatively low hydroxyl number generally is flexible in character while conversely a urethane structure derived from a polyalkylene ether polyol of relatively low average molecular weight and relatively large hydroxyl number, generally is rigid in character. The present invention concerns flexible urethane structures.

Flexible cellular urethane structures, especially those derived from polyalkylene ether polyols, and those prepared by the "one-shot" technique are widely used in comfort cushioning applications. Generally such structures are prepared from formulations comprising polyol, diisocyanate, blowing agent which may be water and optionally a low boiling organic liquid, such as a fluorocarbon, methylene chloride and the like, a surfactant and a catalyst. The surfactant, which is usually a silicone composition, has been considered to be an essential component of these formulations designed for "one-shot" procedures. In such applications the silicone surfactant acts to lower surface tension of the foaming mixture and is thought to provide resilience to the expanding cell walls. In this manner collapse of the foam is prevented during the period the mass is rising and until the polymer chains have attained sufficient length and strength (due to cross links) to be self-supporting. The surfactant also functions to control cell size and the silicones have been found to be especially valuable in formation of small and uniform cells.

Although the polyalkylene ether polyols were found to produce flexible cellular urethane structures of much higher resilience, better humid aging properties and other characteristics than the structures derived from polyester polyols, the flex fatigue characteristic of these structures left something to be desired.

Flex fatigue in a urethane foam is defined as the loss in load bearing ability incurred when the foam is subjected to a constant load or constant deflection during static or dynamic conditions. It is evidenced by a loss not only in load bearing ability but also by a loss in height following application of a load. It is an important criterion of the quality of the urethane foam and gives a measure of the service life of the foam product. Conventional flexible foams may show a loss in load bearing of as much as 40% and in general at least 15%.

It is therefore a principal object of this invention to provide novel flexible cellular urethane structures. Another object is to provide flexible cellular urethane structures of excellent flex fatigue properties. Another object is to devise an effective and economical process for the preparation of flexible cellular urethane structures of excellent flex fatigue properties.

These and other objects of my invention will be apparent from the following description.

In accordance with the present invention, flexible cellular urethane structures of excellent flex fatigue properties are obtained by reacting in the presence of a blowing agent comprising water and an effective amount of a tin catalyst a polyalkylene ether polyol having an average molecular weight in the range of 750 to 4,000 and an hydroxyl number within the range of 30 to 100 with a polyisocyanate consisting essentially of a toluene diamine phosgenation product having an amine equivalent within the range of 90 to 125.

The resultant flexible cellular structures are characterized by having excellent flex fatigue properties, i.e., they can be subjected to static or dynamic loads for extended periods without substantial degradation of their load bearing properties.

A surprising feature of this invention lay in the discovery that surfactants, and especially silicone surfactants are not required in the preparation of the novel products of my invention. Although minor amounts, i.e., at most 0.1 part per 100 parts by weight of polyol may be used, in most instances such components are preferably absent. Surfactants and particularly silicone surfactants, I have found increase the number of closed cells formed, which is undesirable for my purpose.

The novel process of my invention requires the presence of an effective amount of a tin catalyst. Such catalysts include organo tin compounds of the type of dibutyltindilaurate and stannous salts, such as stannous octoate, are known and have been used in the production of "one-shot" polyether foams. These tin catalysts promote the reaction between the isocyanato group and the active hydrogen containing group of the polyol, i.e., the hydroxyl group. I have found that whereas in conventional flexible foam formulations the concentration of tin catalysts is generally from 0.25% to 0.5% by weight, in the present instance, the effective amount is 1% or more, generally less than 5% for the preferred more active catalysts, stannous salts, and about 1.5% to generally less than 4% for the organo tin compounds. The optimum effective amount of each of these catalysts will vary but can readily be determined with the particular formulation of polyol and polyisocyanate to be used.

The preferred tin catalysts are the well-known organic tin salts exemplified by stannous octoate, stannous oleate, stannous laurate and mixtures of these salts.

The organo tin compounds are also well known and have the general formula

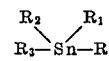

wherein R represents a hydrocarbon alkane radical of 1 to 18 carbons; $R_1$, $R_2$, and $R_3$ represent hydrocarbon alkane radicals of from 1 to 18 carbons, hydrogen, halogen or a hydrocarbon acyloxy radicals, $R_1$, $R_2$ and $R_3$ being alike or different and further two members of this group of $R_1$, $R_2$ and $R_3$ together may be oxygen or sulfur. Representative members of this class include the following specific compounds:

Tetramethyltin
Tetra-n-butyltin
Dimethyldioctyltin
Di-n-butyltindichloride
2-ethylhexyltintriiodide
Di-n-octyltinoxide
Di-n-butyltindilaurate
Di-n-hexyltindiacetate
Di-n-butyltin-bis-(monobutylmaleate)

Tri-n-butyltin-acetate
Dibutyltin distearate

Mixtures of these organo tin compounds with other members of this class and with stannous salts can be used also.

Mixtures of tin catalysts with the well-known tertiary amines, such as triethylamine, N-methyl morpholine, triethylenediamine, N,N, dimethylethanolamine can be used also.

The novel flexible cellular urethane structures are prepared in the presence of a blowing agent comprising water, which by in situ reaction with the isocyanate component produces carbon dioxide. This gas assists in the foaming step producing the cellular structure. This reaction also results in urea linkages which contributes cross linking sites and thus gives strength and load bearing properties to the urethane polymer. If desired, an auxiliary blowing agent, e.g., methylene chloride, fluorocarbons, and like can be added, primarily to give lower density structures and a softer product.

The amount of water can be varied within the range of about 2 to 5 parts per 100 parts by weight of polyol. The auxiliary blowing agent can be present in the amount of up to about 10 parts by weight per 100 parts of polyol. The amount(s) of blowing agent(s) used will depend upon the characteristics, density, load-bearing, etc., desired in the flexible structure being prepared.

The polyol component used in the present invention is a polyalkylene ether triol or diol mixture thereof. Such compounds are known in this art and are believed to have essentially the following general formula

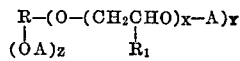

wherein R is the residue of a polyol exemplified below: $R_1$ is hydrogen or methyl; A is hydrogen, $-CH_2CH_2OH$, or $-CH_2CH_2-CH_2-OH$, X is an integer from 5 to 25; Y is an integer 2 or 3 and Z is an integer 0 to 1. Such polyether polyols can be obtained in a known manner by condensation of an alkylene oxide such as ethylene oxide, 1,2-propylene oxide, 1,3-propylene oxide or mixtures thereof, with polyhydric alcohols such as ethylene glycol, propylene glycol, dipropylene glycol, tetramethylene glycol, glycerine trimethylol propane or mixtures thereof, in the presence of a suitable catalyst or initiator such as a trialkylamine, e.g., trimethylamine, or an inorganic base, e.g., potassium hydroxide, or a metal halide, e.g., boron trifluoride. These products resulting from the condensation of 1,2-propylene oxide with a triol are preferred.

Polyether polyols derived from 1,2-propylene oxide and mixtures of 1,2-propylene oxide with ethylene oxide contain a major proportion of secondary hydroxyl groups and only a minor proportion of the more reactive primary hydroxyls. The reactivity of the polyol can be enhanced by reacting such polyols containing essentially secondary hydroxyl groups with ethylene oxide or 1,3-propylene oxide and thereby obtain a polyether polyol having an increased proportion of primary hydroxyl groups. Such polyols are known in this art as "capped" or "tipped" polyether polyols.

The polyisocyanate component used in the present invention consists essentially of a toluene diamine phosgenation reaction product having an amine equivalent within the range of about 90 to 125.

The undistilled toluene diamine phosgenation product refers to the reaction product of a mixture of essentially 2,4- and 2,6-toluene diamines with phosgene from which product essentially all of the reaction solvent, if present during the phosgenation reaction, has been removed by distillation and from which none or up to a major portion of the tolylene diisocyanate has been removed by distillation. Such products may contain up to 90% by weight of volatile aromatic polyisocyanate, i.e., aromatic polyisocyanate separable from the composition by distillation in a molecular still at pressures of about 1 mm. Hg or by partition in a gas chromatograph. Undistilled toluene diamine phosgenation products of this class have been disclosed and claimed in copending U.S. application Ser. No. 225,873, filed Sept. 24, 1962, now U.S. Patent 3,215,652.

If desired, the undistilled toluene diamine phosgenation product can be diluted with up to about 85% by weight of distilled tolylene diisocyanate or a mixture of the isomeric 2,4- and 2,6-tolylene diisocyanates.

The amount of the polyisocyanate component used generally follows conventional practice in the preparation of flexible cellular urethanes, i.e., an amount sufficient to provide from 0.9 to 1.1 isocyanate groups for each hydroxyl group present in the polyol and the water added to provide blowing agent. Preferably the amount is such as to provide a slight excess, 1.01 to 1.05 NCO: IOH.

Additional ingredients may be added to the reaction mixture, if desired, in accordance with conventional practice in this art. Thus the formulation may include pigments, fillers, flame retarders, extenders and the like.

The more detailed practice of my invention will be illustrated by the following examples in which parts and percentages are by weight and temperatures are given in degrees centigrade.

EXAMPLE 1

A mixture consisting of 100 parts of a glycerine initiated polypropylene ether triol tipped with ethylene oxide, having an average molecular weight of 3,500 and a hydroxyl number of 47.6, 3.5 parts of water and 3.0 parts of stannous octoate was prepared. To the vigorously agitated mixture, 52.5 parts of an undistilled toluene diamine phosgenation product, having an amine equivalent of 106.7, were added and the mass was agitated for about 15 seconds. The resulting creamy mixture was poured into a mold and permitted to foam unrestricted. The flexible cellular urethane structure which formed was cured by standing at ambient temperature for about 24 hours. Thereafter a sample of the product was tested by the standard ASTM D-1564T Method A for flex fatigue. The results showed that the product had substantially no load loss at either 25% or 65% deflection.

By use of a Martin-Sweet impeller to agitate the above prepared foamable mixture, and delivery of the creamy mass, through a one inch outlet on the head which was fitted with two 10-mesh screens, to a conventional endless belt form at the rate about 40 lbs./min. a flexible cellular urethane product was obtained. This flexible cellular product was unique in that the walls separating adjacent pores were largely absent. The resultant skeletal-like structure in which each pored irectly communicates with adjacent pores was suitable for use as filter media for gases and liquids.

EXAMPLE 2

For comparison with the product of Example 1 a flexible cellular urethane structure was prepared using a conventional formulation.

A mixture of 100 parts of the polyether triol used in Example 1, 0.25 part of stannous octoate, 4 parts of water, 0.1 part of triethylene diamine, and 1.5 parts of silicone surfactant was prepared by intimately blending these components. To this material were added 49.9 parts of an approximately 80%–20% mixtures of 2,4- and 2,6-tolylene diisocyanates (a distilled toluene diamine phosgenation product having an amine equivalent of about 87). The mass was agitated vigorously for about 15 seconds and then poured into a mold wherein the foaming mass was permitted to rise unrestrictedly. The flexible urethane product was cured at ambient temperature for about 24 hours and then tested for flex fatigue character. This product showed a 33% load loss at 25% deflection and a 25% load loss at 65% deflection.

These results demonstrate the superior flex fatigue character of the novel products of this invention.

EXAMPLE 3

A mixture of 100 parts of a glycerine initiated polypropylene ether triol, having a molecular weight of 3000 and a hydroxyl number of 56, 3.5 parts of water and 4.0 parts of stannous octoate was reacted with 52.7 parts of an undistilled toluene diamine phosgenation product having an amine equivalent of 107.7. The resulting flexible urethane had a medium fine cellular structure and excellent flex fatigue properties, showing no loss in compression load after one week (250,000 cycles) at 25% and 65% deflections.

EXAMPLE 4

A mixture of 100 parts of the ethylene oxide tipped polyether polyol used in Example 1 above, 3.5 parts of water, 1.0 part of stannous octoate and 0.05 part of silicone surfactant was reacted with 43 parts of a 50—50 mixture of an 80–20% mixture of 2,4- and 2,6-tolylene diisocyanates and an undistilled toluene diamine phosgenation product, the polyisocyanate mixture having an amine equivalent of 97. The resulting flexible urethane foam had excellent physical properties and especially good flex fatigue character.

EXAMPLES 5–9

A series of flexible urethane foams were prepared in which the amounts and types of catalysts used were varied. The foams were prepared in the conventional manner and were formulated as follows:

|  | Parts |
|---|---|
| Polyol (polyoxypropylene triol 3,000 mol. wt.) | 200 |
| Water | 7 |
| Catalyst, variable. | |
| Polyisocyanate, amine equivalent 106.7 | 113 |

The catalyst composition and description of the foam product are set out in the following table.

TABLE 1

| | Example No. | | | | |
|---|---|---|---|---|---|
| Catalyst | 5 | 6 | 7 | 8 | 9[1] |
| Stannous octoate | 3 | 7 | 2 | 1 | 3 |
| Dimethylethanolamine | | | 1 | 2 | |
| Foam evaluation | Essentially open cells | | | Collapsed | Open cells |

[1] Polyol used was a mixture of 100 parts triol and 100 parts of propylene glycol initiated polyoxypropylene ether diol of about 2,000 mol. wt. and a hydroxy number of 56.

EXAMPLE 10

A mixture of 200 parts of the polyether diol used in Example 9 above, 7 parts of water and 8 parts of stannous octoate was reacted with 113 parts of undistilled toluene diamine phosgenation product, having an amine equivalent of 106.7, in the usual manner. The resultant flexible cellular urethane structure possessed good physical properties and especially good flex fatigue character.

It can thus be seen that flexible cellular urethane structures of excellent flex fatigue properties have been devised and that processes for the preparation of such structures which are conveniently and economically carried out have been provided.

The preparation of my novel structures has been illustrated by several examples the details of which, as will be obvious to those skilled in the art can be varied over considerable ranges without departing from the scope or spirit of my invention.

I claim:

1. A flexible cellular urethane product of excellent flex fatigue properties and predominantly open cell structure obtained by reacting in a one-shot process and in the presence of a blowing agent comprising water, a tin catalyst in an amount in the range of about 1 part to less than 5 parts by weight per 100 parts of polyol and surfactant in an amount of no more than 0.1 part by weight per 100 parts of polyol, a polyalkylene ether polyol having an average molecular weight within the range of 750 to 4,000 and a hydroxyl number within the range of 30 to 100 and an organic polyisocyanate composition having an amine equivalent within the range of about 90 to 125 and consisting essentially of an undistilled toluene diamine phosgenation product obtained by the steps of reacting toluene diamine with phosgene in the pressence of solvent followed by removal of said solvent.

2. A flexible cellular urethane product of excellent flex and fatigue properties and of predominantly open cell structure obtained by reacting in the presence of a blowing agent comprising water, a tin catalyst in an amount in the range of about 1 part to less than 5 parts by weight per 100 parts of polyol and 0 to 0.1 part of surfactant per 100 parts of polyol, a polyalkylene ether polyol having an average molecular weight within the range of 750 to 4,000 and a hydroxyl number within the range of 30 to 100 and an organic polyisocyanate composition having an amine equivalent within the range of about 90 to 125 and consisting essentially of a mixture of distilled tolylene diisocyanate in an amount of no more than 85% by weight of the mixture and undistilled toluene diamine phosgenation product said undistilled product being obtained by the steps of reacting toluene diamine with phosgene in the presence of solvent followed by removal of said solvent.

3. A process for the preparation of flexible cellular urethane structure of excellent flex fatigue properties and of predominantly open cell structure which comprises reacting in the presence of a blowing agent comprising water, a tin catalyst within the range of at least 1 but less than 5 parts by weight per 100 parts of polyol and 0 to 0.1 part of surfactant per 100 parts of polyol, a polyalkylene ether polyol having an average molecular weight of 750 to 4,000 and a hydroxyl number within the range of 30 to 100 with an organic polyisocyanate composition having an amine equivalent within the range of about 90 to 125 and consisting essentially of a mixture of distilled tolylene diisocyanate in an amount of no more than 85% by weight of the mixture and undistilled toluene diamine phosgenation product said undistilled product being obtained by the steps of reacting toluene diamine with phosgene in the presence of solvent followed by removal of said solvent.

4. A flexible cellular urethane product of excellent flex fatigue properties and of predominantly open cell structure obtained by reacting in a one-shot process and in the presence of a blowing agent comprising water, a tin catalyst in an effective amount of at least 1 part by weight per 100 parts of polyol, and in the absence of surfactant, a polyalkylene ether polyol having an average molecular weight within the range of 750 to 4,000 and a hydroxyl number within the range of 30 to 100 and an organic polyisocyanate composition having an amine equivalent within the range of about 90 to 125 and consisting essentially of an undistilled toluene diamine phosgenation product obtained by reacting toluene diamine with phosgene in the presence of a solvent followed by removal of said solvent.

5. A process for the preparation of flexible cellular urethane structures of excellent flex fatigue properties and of predominantly open cell structure which comprises reacting in a one-shot process and in the presence of a blowing agent comprising water, a tin catalyst in an effective amount of at least 1 part by weight per 100 parts of polyol and 0.0 to 0.1 part of surfactant per 100 parts of polyol, a polyalkylene ether polyol having an average molecular weight within the range of 750 to 4,000 and a hydroxyl number within the range of 30 and 100 with an organic polyisocyanate composition having an amine equivalent within the range of about 90 and 125 and consisting essentially of an undistilled toluene diamine phosgenation product obtained by reacting toluene diamine with phosgene in the presence of a solvent followed by removal of said solvent.

6. A process as defined in claim 5 wherein the catalyst is an organic tin salt.

7. A process for the preparation of flexible urethane structures of excellent flex fatigue properties and of predominantly open cell structure which comprises reacting in a one-shot process and in the presence of a blowing agent of 2 to 5 parts water and up to 10 parts auxiliary organic blowing agent per 100 parts of polyol, a tin catalyst in an effective amount within the range of at least 1 but less than 5 parts by weight per 100 parts of polyol and 0–0.1 part surfactant per 100 parts polyol, a polyalkylene ether polyol having an average molecular weight within the range of 750 to 4,000 and a hydroxyl number within the range of 30 to 100 and an organic polyisocyanate composition in an amount sufficient to provide 0.9 to 1.1 isocyanate groups for each hydroxyl group present in the polyol and water, said polyisocyanate composition having an amine equivalent within the range of about 90 to 125 and consisting essentially of an undistilled toluene diamine phosgenation product obtained by the steps of reacting toluene diamine with phosgene in the presence of solvent followed by removal of said solvent.

8. A process as claimed in claim 7 wherein the catalyst is stannous octoate.

References Cited

UNITED STATES PATENTS

| | | | |
|---|---|---|---|
| 3,097,191 | 7/1963 | France et al. | 260—77.5 |
| 3,206,416 | 9/1965 | Dahm | 260—2.5 |
| 3,215,652 | 11/1965 | Kaplan | 260—2.5 |
| 2,726,219 | 12/1965 | Hill | 260—2.5 |
| 3,072,582 | 1/1963 | Frost | 260—2.5 |

FOREIGN PATENTS

| | | |
|---|---|---|
| 916,745 | 1/1963 | Great Britain |
| 1,241,345 | 8/1960 | France. |

DONALD E. CZAJA, Primary Examiner

M. J. WELSH, Assistant Examiner